(12) United States Patent
Kuwayama et al.

(10) Patent No.: US 9,555,857 B2
(45) Date of Patent: Jan. 31, 2017

(54) BICYCLE FRONT DERAILLEUR

(71) Applicant: Shimano Inc., Sakai, Osaka (JP)

(72) Inventors: Kazuya Kuwayama, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 261 days.

(21) Appl. No.: 14/296,135

(22) Filed: Jun. 4, 2014

(65) Prior Publication Data
US 2015/0353166 A1   Dec. 10, 2015

(51) Int. Cl.
*B62M 9/132* (2010.01)
*B62M 9/135* (2010.01)

(52) U.S. Cl.
CPC ............. *B62M 9/132* (2013.01); *B62M 9/135* (2013.01)

(58) Field of Classification Search
CPC ...... B62M 9/1331; B62M 9/132; B62M 9/135
USPC ...................................................... 474/80, 82
See application file for complete search history.

(56) References Cited

U.S. PATENT DOCUMENTS

| | | | | |
|---|---|---|---|---|
| 7,306,531 B2* | 12/2007 | Ichida | ................... | B62M 9/122 474/70 |
| 7,341,532 B2* | 3/2008 | Ichida | ................... | B62M 25/08 474/70 |
| 2005/0189158 A1* | 9/2005 | Ichida | ................... | B62M 25/08 180/260 |
| 2005/0192137 A1* | 9/2005 | Ichida | ................... | B62M 9/132 474/70 |
| 2005/0192139 A1* | 9/2005 | Ichida | ................... | B62M 25/08 474/80 |
| 2005/0197222 A1* | 9/2005 | Tatsumi | ................. | B62M 9/132 474/80 |
| 2005/0205323 A1* | 9/2005 | Ichida | ................... | B62M 25/08 474/80 |
| 2006/0189421 A1* | 8/2006 | Ichida | ................... | B62M 9/132 474/80 |
| 2006/0189422 A1* | 8/2006 | Ichida | ................... | B62M 9/132 474/80 |
| 2007/0037645 A1* | 2/2007 | Ishikawa | ................ | B62M 25/08 474/80 |
| 2007/0184925 A1* | 8/2007 | Ichida | ................... | B62M 25/08 474/80 |
| 2014/0114538 A1* | 4/2014 | Shipman | .................. | F16H 9/06 701/51 |
| 2014/0243126 A1* | 8/2014 | Kuwayama | ........... | B62M 9/132 474/80 |
| 2014/0243128 A1* | 8/2014 | Pasqua | .................. | B62M 9/134 474/80 |

* cited by examiner

*Primary Examiner* — William E Dondero
*Assistant Examiner* — Robert T Reese
(74) *Attorney, Agent, or Firm* — Global IP Counselors (57) ABSTRACT

A bicycle front derailleur is basically provided with a base member, a movable member, an electric driving unit and a biasing member. The base member includes a bicycle mounting portion. The movable member is movably supported with respect to the base member between a first position and a second position that is farther than the first position from the base member. The electric driving unit is operatively coupled to the movable member to move the movable member between the first position and the second position. The biasing member is operatively disposed between the base member and the movable member to bias the movable member towards the second position.

12 Claims, 6 Drawing Sheets

BICYCLE FRONT DERAILLEUR

BACKGROUND

Field of the Invention

This invention generally relates to a bicycle front derailleur. More specifically, the present invention relates to a bicycle front derailleur having an electric driving unit for moving a movable member to shift a bicycle chain.

Background Information

Generally, a front derailleur is mounted to the bicycle frame adjacent to the front chain rings to shift a chain laterally between the front chain rings or sprockets. A front derailleur includes a fixed or base member that is non-movably secured to the bicycle frame, and a movable member. The movable member includes a chain guide that is movably supported relative to the fixed member to move between at least two lateral shift positions. Typically, a linkage assembly is coupled between the fixed member and the movable member in order to movably support the movable member with the chain guide. The chain guide usually has a pair of cage plates or guide plates arranged to selectively contact and move the chain between the front chain rings.

SUMMARY

Generally, the present disclosure is directed to various features of a bicycle front derailleur having an electric driving unit. In one feature, a front derailleur is provided in which a biasing member aids an electric driving unit in moving a movable member from one sprocket position to another.

In view of the state of the known technology and in accordance with a first aspect of the present disclosure, a bicycle front derailleur is provided that basically comprises a base member, a movable member, an electric driving unit and a biasing member. The base member includes a bicycle mounting portion. The movable member is movably supported with respect to the base member between a first position and a second position that is farther than the first position from the base member. The electric driving unit is operatively coupled to the movable member to move the movable member between the first position and the second position. The biasing member is operatively disposed between the base member and the movable member to bias the movable member towards the second position.

In accordance with a second aspect of the present invention, the bicycle front derailleur according to the first aspect further comprises a connecting structure movably connecting the movable member to the base member, and the electric driving unit having an output shaft linked to the connecting structure.

In accordance with a third aspect of the present invention, the bicycle front derailleur according to the second aspect is configured so that the biasing member includes a torsion spring that has a first end applying a biasing force against the movable member, a second end applying a biasing force against the connecting structure, and a coiled portion disposed between the first and second ends.

In accordance with a fourth aspect of the present invention, the bicycle front derailleur according to the third aspect is configured so that the connecting structure further includes a first support link and a second support link. The first and second support links have first ends pivotally attached to the base member and second ends pivotally mounted to the movable member to define a four-bar linkage.

In accordance with a fifth aspect of the present invention, the bicycle front derailleur according to the fourth aspect is configured so that the coiled portion of the torsion spring is disposed on a pivot axis of the four-bar linkage.

In accordance with a sixth aspect of the present invention, the bicycle front derailleur according to the second aspect is configured so that the connecting structure further includes a first support link and a second support link. The first and second support links have first ends pivotally attached to the base member and second ends pivotally mounted to the movable member to define a four-bar linkage.

In accordance with a seventh aspect of the present invention, the bicycle front derailleur according to the first aspect is configured so that the movable member includes a chain guide having a first guide plate having a first inner surface and a second guide plate having a second inner surface. The first and second inner surfaces face each other to form lateral sides of a chain receiving slot therebetween.

In accordance with an eighth aspect of the present invention, the bicycle front derailleur according to the seventh aspect is configured so that the biasing member includes a torsion spring that has a first end applying a biasing force against the first guide plate, a second end applying a biasing force against a connecting structure that movably connects the movable member to the base member, and a coiled portion disposed between the first and second ends.

Also other objects, features, aspects and advantages of the disclosed bicycle front derailleur will become apparent to those skilled in the art from the following detailed description, which, taken in conjunction with the annexed drawings, discloses one embodiment of the bicycle front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
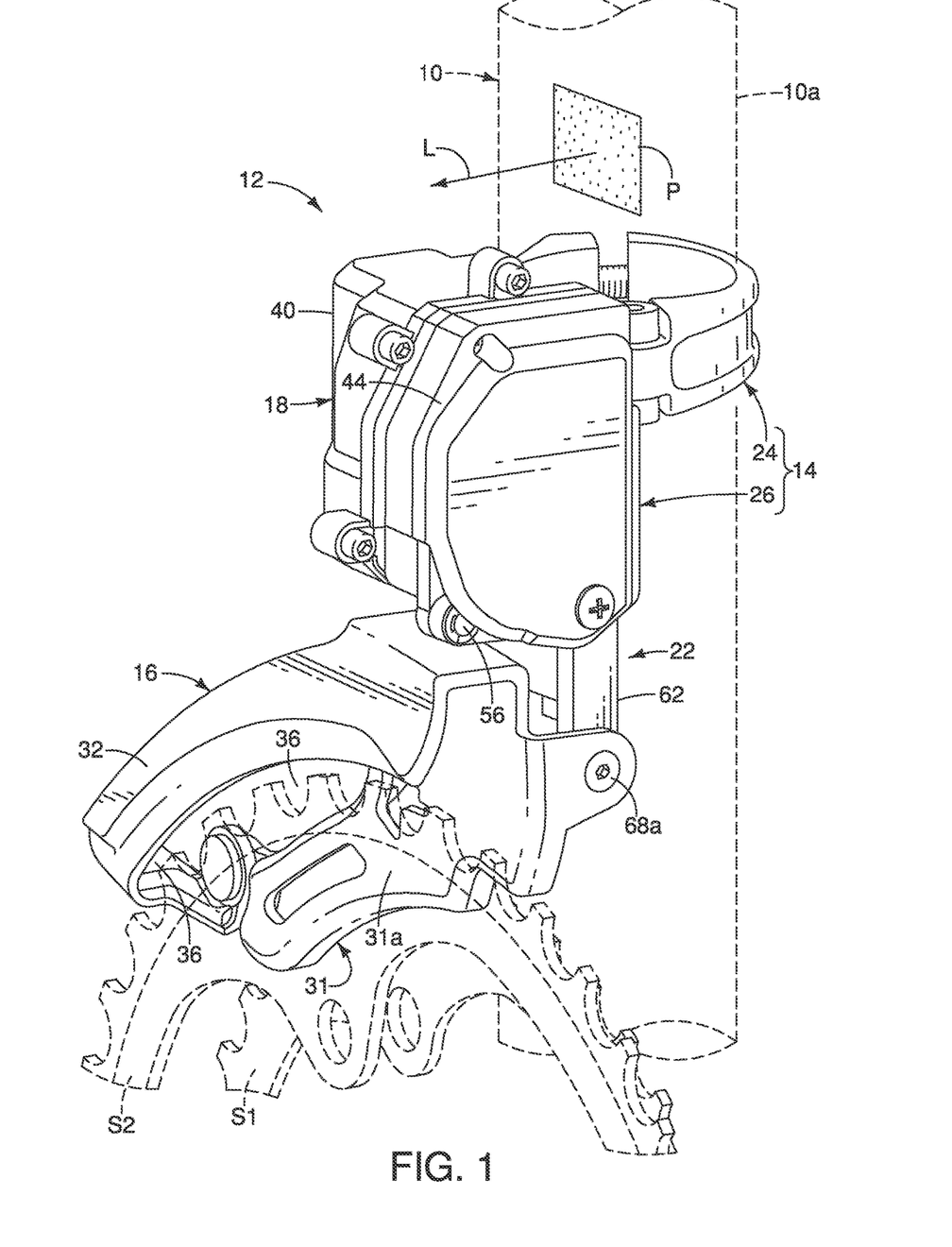
FIG. 1 is a front perspective view of a bicycle front derailleur in accordance with one illustrative embodiment.

Referring initially to FIG. 1, a portion of a bicycle frame 10 is illustrated with a front derailleur 12 in accordance with one embodiment. The bicycle front derailleur 12 basically comprises a base member 14, a movable member 16, an electric driving unit 18 and a biasing member 20. Here, the base member 14 is fixedly mounted to a seat tube 10a of the bicycle frame 10. In the illustrated embodiment, the bicycle front derailleur 12 further comprises a connecting structure 22 movably connecting the movable member 16 to the base member 14. The movable member 16 is moved with respect to the base member 14 by the electric driving unit 18 in a lateral direction L with respect to a center longitudinal plane P of the bicycle frame 10. Accordingly, the movable member 16 is movable between a retracted or first position (FIGS. 2 and 3) and an extended or second position (FIGS. 4 and 5) with respect to the base member 14. The front derailleur 12 can be designed to be used with a bicycle having two or more front sprockets for shifting a bicycle chain (not shown) between the sprockets. However, for the sake of brevity, the front derailleur 12 will only be explained with respect to a bicycle with two sprockets (e.g., a first (small) sprocket S1 and a second (large) sprocket S2).

The force of the electric driving unit 18 which is needed to move a bicycle chain from the first (small) sprocket S1 to the second (large) sprocket S2 is greater than the force needed to move a bicycle chain from the second (large) sprocket S2 to the first (small) sprocket S1. Thus, as explained below, the biasing member 20 is arranged to reduce the load of the electric driving unit 18 when moving bicycle chain (not shown) with the movable member 16 from the first (small) sprocket S1 to the second (large) sprocket S2. In particular, as explained below, the biasing member 20 applies a biasing force that biases the movable member 16 in the lateral direction L away from the center longitudinal plane P of the bicycle frame 10. In this way, the force needed by the electric driving unit 18 can be reduced by using the biasing force provided by the biasing member 20 to supplement the driving force of the electric driving unit 18 to move the movable member 16 for shifting a bicycle chain (not shown) from the first (small) sprocket S1 to the second (large) sprocket S2. Therefore electricity needed to actuate an electric motor 42 (explained below) can be reduced compared with a conventional front derailleur with a biasing member which biases the movable member toward the bicycle frame.

As seen in the FIGS. 2 to 5, the base member 14 acts as a mounting fixture for supporting the front derailleur 12 on the bicycle frame 10. The base member 14 includes a bicycle mounting portion 24 and a support portion 26. Here, the bicycle mounting portion 24 is a hinged type band clamp that is mounted to the seat tube 10a of the bicycle frame 10. Alternatively, the bicycle mounting portion 24 can be configured as a braze-on mounting member that attaches to a braze-on hanger on the bicycle seat tube 10a in a conventional manner. The bicycle mounting portion 24 is either unitarily formed with the support portion 26, or is fixedly attached to the support portion 26. In the illustrated embodiment, the support portion 26 movably supports the movable member 16 via the connecting structure 22. In the illustrated embodiment, the support portion 26 is a separate member that is fixed to the bicycle mounting portion 24. The electric driving unit 18 is attached to the support portion 26 so that the electric driving unit 18 is stationary with respect to the bicycle frame 10.

Referring to FIGS. 2 to 5, the movable member 16 will now be discussed in greater detail. The movable member 16 is movably supported with respect to the base member 14 between the first position (FIGS. 2 and 3) and the second position (FIGS. 4 and 5) that is farther than the first position from the base member 14. In the illustrated embodiment, the first position of the movable member 16 corresponds to a low position (i.e., a fully retracted end position) of the front derailleur 12. On the other hand, in the illustrated embodiment, the second position of the movable member 16 corresponds to a top position (i.e., a fully extended end position) of the front derailleur 12. It will be will be apparent to those skilled in the bicycle field from this disclosure that the front derailleur 12 can have one or more intermediate positions between the first and second positions.

The movable member 16 includes a pair of attachment flanges 28a and 28b that is attached to the connecting structure 22. The movable member 16 includes a chain guide 30 having a first guide plate 31 having a first inner surface 31a and a second guide plate 32 having a second inner surface 32a. The first guide plate 31 includes the attachment flanges 28a and 28b for movably attaching the connecting structure 22 to the chain guide 30 as explained below. The first guide plate 31 and the second guide plate 32 are laterally spaced apart and rigidly connected to each other at upper end portions by an upper connecting member 34 and at lower end portions by a lower connecting member 36. The first and second inner surfaces 31a and 32a face each other to form lateral sides of a chain receiving slot 34 therebetween. The first guide plate 31 constitutes an inner guide plate of the chain guide 30, while the second guide plate 32 constitutes an outer guide plate of the chain guide 30. The first guide plate 31 pushes a chain in an outward direction to disengage from the first sprocket S1 and moves the chain onto the second sprocket S2 during an upshift operation.

Figure 2:
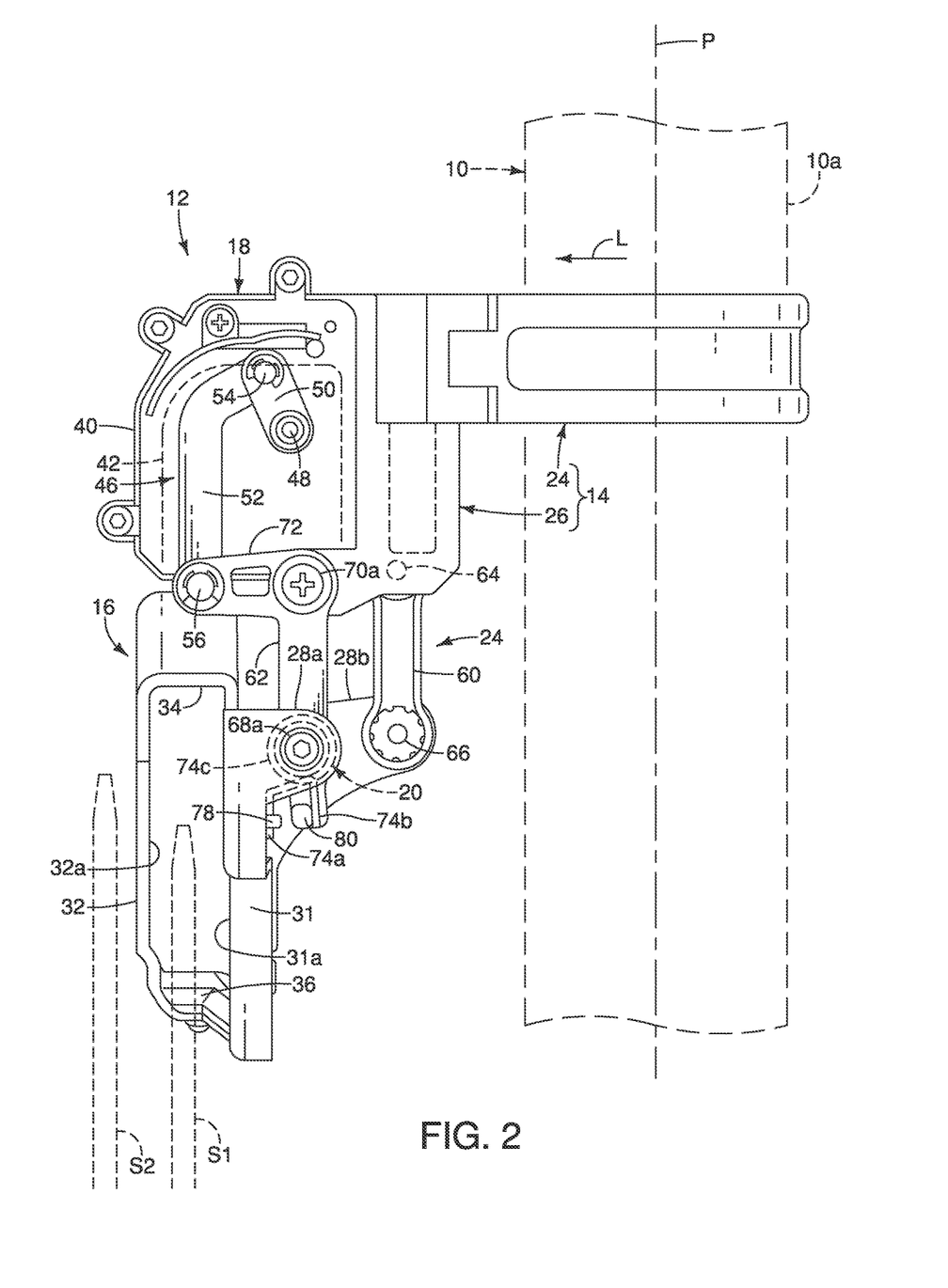
FIG. 2 is a front elevational view of the bicycle front derailleur illustrated in FIG. 1 with the chain guide of the movable member in a first position.
Figure 3:
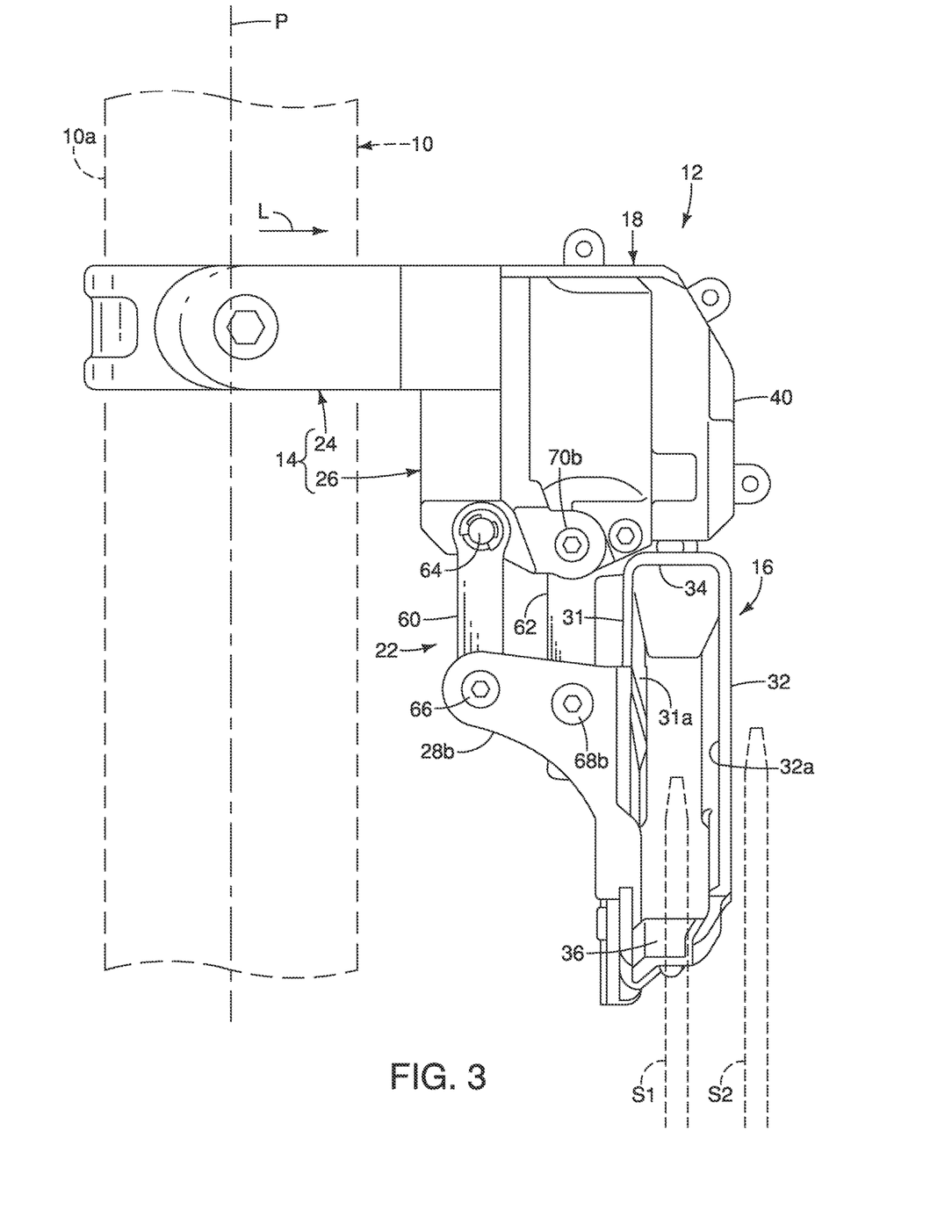
FIG. 3 is a rear elevational view of the bicycle front derailleur illustrated in FIGS. 1 and 2 with the chain guide in the first position that is shown in FIG. 2.

Referring mainly to FIGS. 1 and 2, the electric driving unit 18 will now be discussed in greater detail. The electric driving unit 18 includes a motor housing 40 that is fixedly mounted on the support portion 26 of the base member 14. The electric driving unit 18 further includes a reversible electric motor 42 (shown in broken lines in FIG. 2). The reversible electric motor 42 is electrically connected to a remote power supply such as a battery (not shown) and/or a generator (not shown) via an electrical cord (not shown). Alternatively, the electric driving unit 18 can be provided with a rechargeable battery (not shown). The electric motor 42 is selectively operated by a rider or user using a user operating device (not shown) that is typically mounted on the handlebar of a bicycle.

Figure 4:
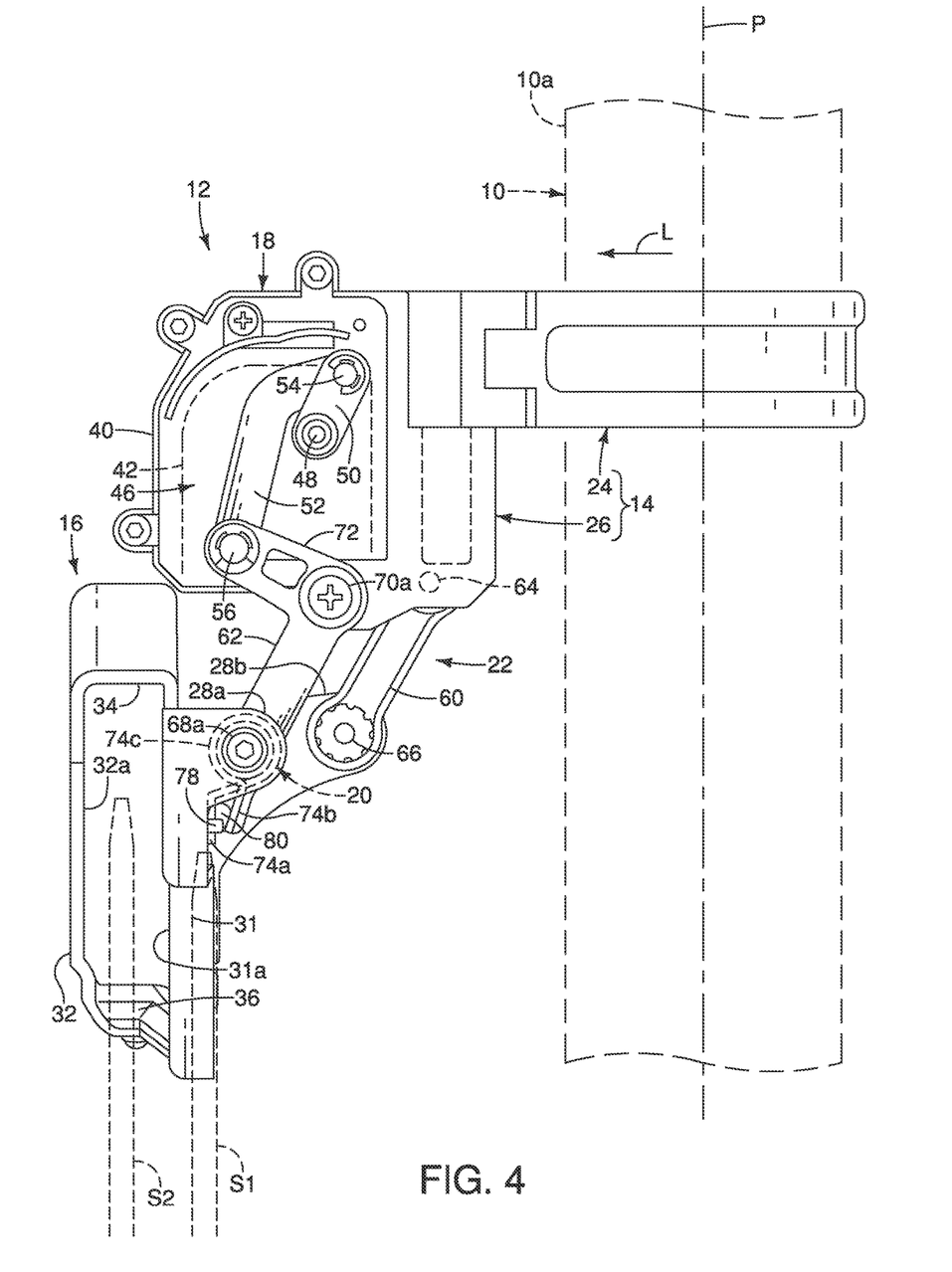
FIG. 4 is a front elevational view of the bicycle front derailleur illustrated in FIGS. 1 to 3 with the chain guide in a second position.

As seen in FIG. 1, a cover 44 is secured to the motor housing 40 by a plurality of snap-fitted connections or by other suitable fasteners such as screws. In FIGS. 2 and 4, the cover 44 has been removed to show how the electric driving unit 18 is operatively coupled to the movable member 16 to move the movable member 16 between the first position (FIG. 2) and the second position (FIG. 4). In particular, a motor linkage 46 operatively connects the electric motor 42 to the connecting structure 22 as discussed below. Preferably, the electric driving unit 18 further includes a gear reduction unit (not shown) that is provided in the motor housing 40 between the electric motor 42 and the motor linkage 46. Since gear reduction units are commonly used in electric derailleurs, the gear reduction unit of the electric driving unit 26 will not be discussed and/or illustrated herein.

Figure 5:
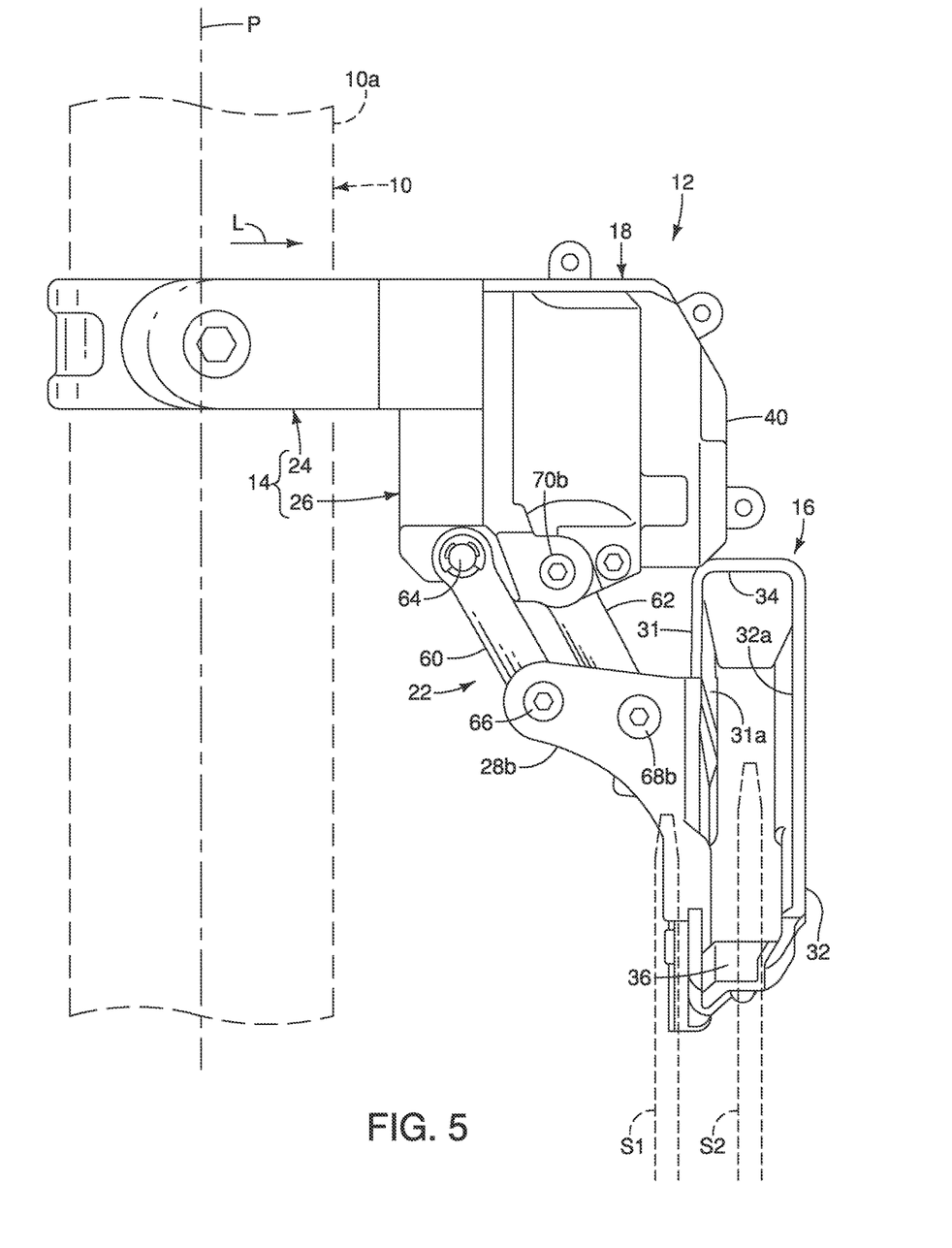
FIG. 5 is a rear elevational view of the bicycle front derailleur illustrated in FIGS. 1 to 4 with the chain guide in the second position that is shown in FIG. 4.

As seen in FIGS. 2 and 4, the electric driving unit 18 has an output shaft 48 linked to the connecting structure 22 via the motor linkage 46. In this way, the electric driving unit 18 drives the connecting structure 22 via the motor linkage 46 to move the chain guide 30 relative to the base member 14. Preferably, the output shaft 48 is connected to the electric motor 42 via a gear reduction unit (not shown). In any case, rotation of the output shaft 48 moves the motor linkage 46 which in turn moves the connecting structure 22 for moving the chain guide 30 relative to the base member 14 between the first position (FIGS. 2 and 3) and the second position (FIGS. 4 and 5).

Here, the motor linkage 46 includes a driving link 50 and a driven link 52. However, it will be apparent to those skilled in the bicycle field from this disclosure that the motor linkage 46 can be replaced with other types of mechanisms as needed and/or desired. The driving link 50 has a first end that is fixedly mounted to the output shaft 48 (i.e., the input member) such that the driving link 50 rotates together with the output shaft 48. Thus, the driving link 50 is rotatably arranged on the base member 20 by the output shaft 48. The driving link 50 has a second end that is pivotally coupled to a first end of the driven link 52 by a first connecting pin 54. The driven link 52 has a second end pivotally coupled to the connecting structure 22 by a second connecting pin 56.

Referring mainly to FIGS. 2 to 5, the connecting structure 22 will now be discussed in greater detail. Basically, the connecting structure 22 pivotally links the movable member 16 to the base member 14. In the illustrated embodiment, the connecting structure 22 further includes a first support link 60 and a second support link 62. The first and second support links 60 and 62 have first ends pivotally attached to the support portion 26 of the base member 14 and second ends pivotally mounted to the attachment flanges 28a and 28b of the movable member 16 to define a four-bar linkage. In particular, the first end of the first support link 60 is pivotally attached to the support portion 26 of the base member 14 by a first pivot pin 64. The second end of the first support link 60 is pivotally attached to the attachment flange 28b of the movable member 16 by a second pivot pin 66. The second support link 62 has an "H" shape such that the first end of the second support link 62 has a pair of first attachment parts and the second of the second support link 62 has a pair of second attachment parts. The first attachment parts of the first end of the second support link 62 are pivotally attached to the support portion 26 of the base member 14 by third pivot pins 70a and 70b. The second attachment parts of the second end of the second support link 62 are pivotally attached to the attachment flanges 28a and 28b of the movable member 16 by fourth pivot pins 68a and 68b.

Although a four-bar linkage is used in the illustrated embodiment, the movable member 16 can be connected to the base member 14 with other connecting structures. In other words, the front derailleur 12 can be configured to have a connecting structure which is constructed with a single link member, or which is constructed with more than two link members. Thus, the present invention can be used with electric front derailleurs that use other types of connecting structures.

The second support link 62 includes an attachment portion 72 in the form of an extension arm that is pivotally connected to the second end of the driven link 52 by the second connecting pin 56. Thus, when the electric motor 42 is actuated, the output shaft 48 will rotate, which in turn will move the driving link 50 and the driven link 52 such that the first and second support links 60 and 62 will pivot about the pivot pins 64, 68a and 68b. In this way, chain guide 30 of the movable member 16 can move with respect to the base member 14 between the retracted or first position (FIGS. 2 and 3) and a second or extended position (FIGS. 4 and 5) with respect to the bicycle frame 10.

Figure 6:
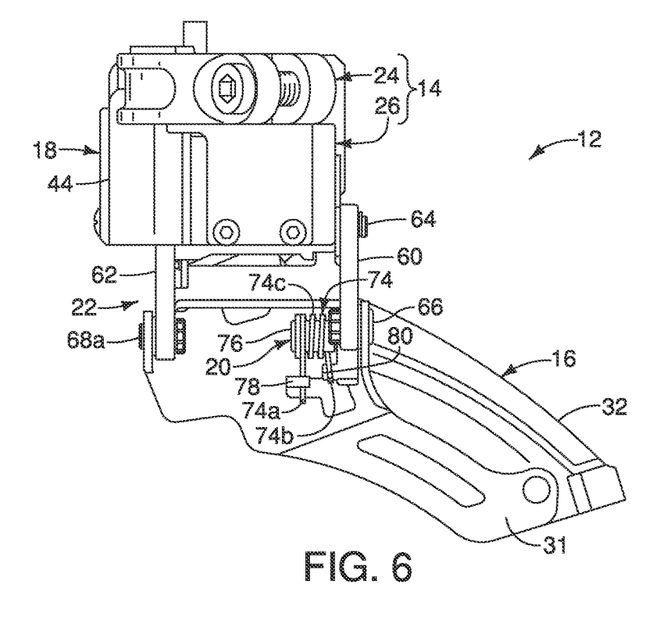
FIG. 6 is an inside elevational view of the bicycle front derailleur illustrated in FIGS. 1 to 5.
Figure 7:
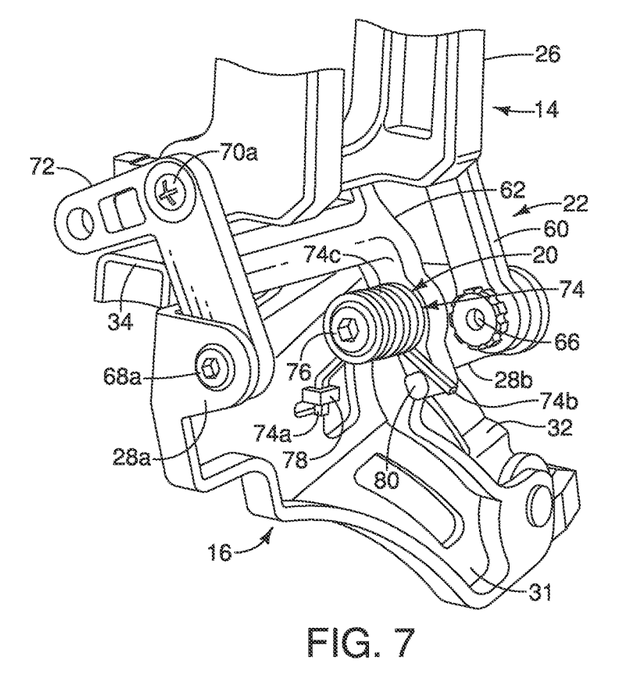
FIG. 7 is a front inside perspective view of the base member and the movable member of the bicycle front derailleur illustrated in FIGS. 1 to 6.

Referring now to FIGS. 6 and 7, the biasing member 20 will now be discussed in greater detail. In the illustrated embodiment, the biasing member 20 is operatively disposed between the base member 14 and the movable member 16 to bias the movable member 16 towards the second position. If the driven link 52 were disconnected, then the biasing member 20 would maintain the movable member 16 in the second position over the second sprocket S2. Preferably, the biasing member 20 is in a preloaded state when the movable member 16 is held in the second position over the second sprocket S2 by the movable member 16 with the driven link 52 disconnected.

In the illustrated embodiment, the biasing member 20 includes a torsion spring 74. The biasing member 20 further includes a support member or pin 76 that is mounted on the second support link 62. In particular, in the illustrated embodiment, the support member 76 is a bolt that screws into the pivot pin 68b such that the support member 76 is coaxially arranged with the pivot pin 68b. The torsion spring 74 has a first end 74a, a second end 74b and a coiled portion 74c. The first end 74a applies a biasing force against the movable member 16. The second end 74b applies a biasing force against the second support link 62 of the connecting structure 22. The coiled portion 74c is disposed between the first and second ends 74a and 74b. The coiled portion 74c of the torsion spring 74 is mounted on the support member 76. Since the axis of the support member 76 is coaxially arranged with the pivot axis of the pivot pin 68b, the coiled portion 74c of the torsion spring 74 is disposed on a pivot axis of the four-bar linkage. The first end 74a of the torsion spring 74 contacts the first guide plate 31 of the chain guide 30. In particular, the first guide plate 31 includes a hook 78 that receives the first end 74a of the torsion spring 74. In other words, the first end 74a of the torsion spring 74 is attached to the chain guide 30 by the hook 78. The second end 74b of the torsion spring 74 abuts or contacts an abutment 80 of the second support link 62.

In performing a chain shifting operation, the electric motor 42 is operated by a user operating device (not shown) to turn the output shaft 48 of the electric driving unit 18. Depending on the rotational direction of the output shaft 48, the connecting structure 22 will either move the chain guide 30 towards or away from the bicycle frame 10. When the chain guide 30 is in the second position, as seen in FIGS. 4 and 5, the torsion spring 74 of the biasing member 20 is in preloaded condition.

As viewed in FIGS. 2 and 4, to shift the chain guide 30 from the first position (FIG. 2) to the second position (FIG. 4), the output shaft 48 of the electric driving unit 18 is rotated in a clockwise direction to move the chain guide 30 from being positioned over the first sprocket S1 to being positioned over the second sprocket S2. On the other hand, as viewed in FIGS. 2 and 4, to shift the chain guide 30 from the second position (FIG. 4) to the first position (FIG. 2), the output shaft 48 of the electric driving unit 18 is rotated in a counterclockwise direction to move the chain guide 30 from being positioned over the second sprocket S2 to being positioned over the first sprocket S1.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle front derailleur. Accordingly, these directional terms, as utilized to describe the bicycle front derailleur should be interpreted relative to a bicycle in an upright riding position on a horizontal surface and that is equipped with the bicycle front derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle front derailleur comprising:
   a base member including a bicycle mounting portion;
   a movable member movably supported with respect to the base member between a first position and a second position that is farther than the first position from the base member;
   an electric driving unit operatively coupled to the movable member to move the movable member between the first position and the second position; and
   a biasing member operatively disposed between the base member and the movable member to bias the movable member towards the second position.

2. The bicycle front derailleur according to claim 1, further comprises
   a connecting structure movably connecting the movable member to the base member, and the electric driving unit having an output shaft linked to the connecting structure.

3. The bicycle front derailleur according to claim 2, wherein
   the biasing member includes a torsion spring that has a first end applying a biasing force against the movable member, a second end applying a biasing force against the connecting structure, and a coiled portion disposed between the first and second ends.

4. The bicycle front derailleur according to claim 3, wherein
   the connecting structure further includes a first support link and a second support link, the first and second support links have first ends pivotally attached to the base member and second ends pivotally mounted to the movable member to define a four-bar linkage.

5. The bicycle front derailleur according to claim 4, wherein
   the coiled portion of the torsion spring is disposed on a pivot axis of the four-bar linkage.

6. The bicycle front derailleur according to claim 4, wherein
   the first end of the torsion spring contacts the second support link and the second end of the torsion spring contacts a first guide plate of the movable member.

7. The bicycle front derailleur according to claim 6, wherein
   the biasing member further includes a support member mounted on the connecting structure between the first and second ends of the torsion spring, the coiled portion of the torsion spring being disposed on the support member.

8. The bicycle front derailleur according to claim 7, wherein
   the support member is coaxially arranged about a pivot pin of the second support link of the base member.

9. The bicycle front derailleur according to claim 3, wherein
   the biasing member further includes a support member mounted on the connecting structure between the first and second ends of the torsion spring, the coiled portion of the torsion spring being disposed on the support member.

10. The bicycle front derailleur according to claim 2, wherein
    the connecting structure further includes a first support link and a second support link, the first and second support links have first ends pivotally attached to the base member and second ends pivotally mounted to the movable member to define a four-bar linkage.

11. The bicycle derailleur according to claim 1, wherein the movable member includes a chain guide having a first guide plate having a first inner surface and a second guide plate having a second inner surface, the first and second inner surfaces facing each other to form lateral sides of a chain receiving slot therebetween.

12. The bicycle front derailleur according to claim 11, wherein
the biasing member includes a torsion spring that has a first end applying a biasing force against the first guide plate, a second end applying a biasing force against a connecting structure that movably connects the movable member to the base member, and a coiled portion disposed between the first and second ends.

* * * * *